Nov. 26, 1963  E. WILDHABER  3,111,865
METHOD OF RELIEVING HOBS
Filed Nov. 2, 1959  3 Sheets-Sheet 1

INVENTOR:
E. WILDHABER
BY
Attorney

Nov. 26, 1963    E. WILDHABER    3,111,865
METHOD OF RELIEVING HOBS
Filed Nov. 2, 1959    3 Sheets-Sheet 2

INVENTOR:
E. WILDHABER
BY
Attorney

Nov. 26, 1963  E. WILDHABER  3,111,865
METHOD OF RELIEVING HOBS
Filed Nov. 2, 1959  3 Sheets-Sheet 3
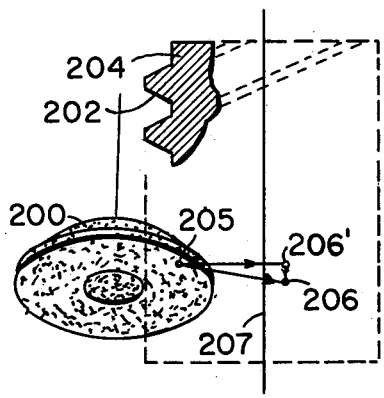
FIG. 13
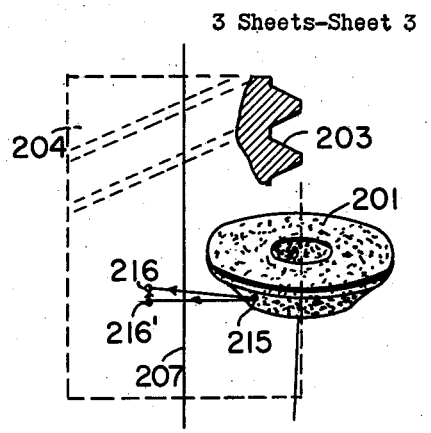
FIG. 15
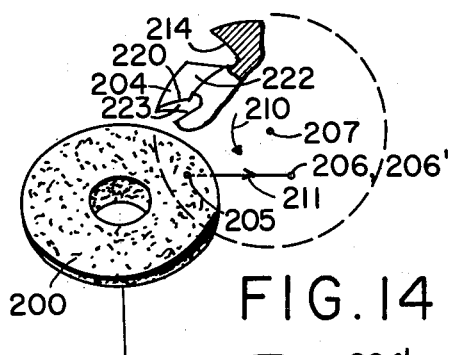
FIG. 14
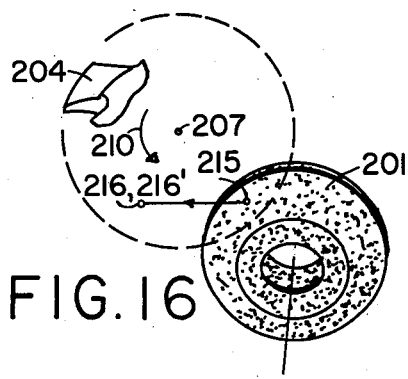
FIG. 16
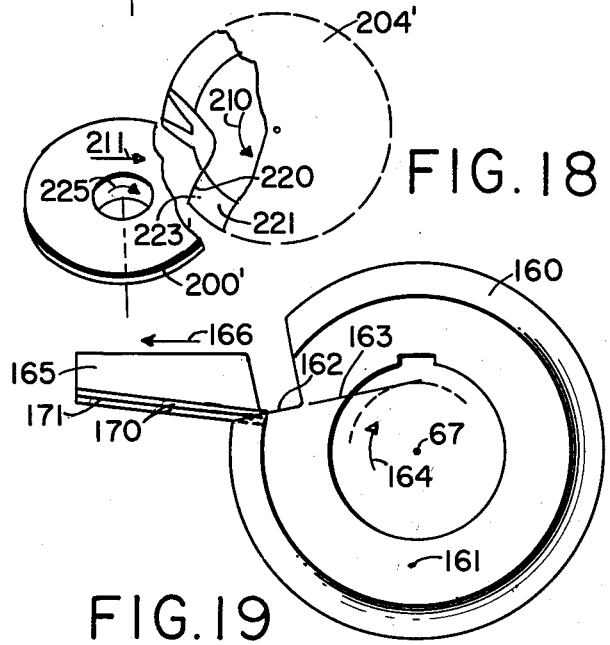
FIG. 18
FIG. 19
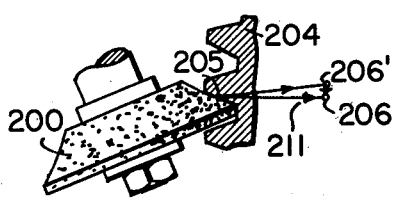
FIG. 17
INVENTOR:
E. WILDHABER
By: [signature]
Attorney

United States Patent Office 3,111,865
Patented Nov. 26, 1963

3,111,865
METHOD OF RELIEVING HOBS
Ernest Wildhaber, Brighton, N.Y.
(124 Summit Drive, Rochester 20, N.Y.)
Filed Nov. 2, 1959, Ser. No. 850,141
10 Claims. (Cl. 76—101)

The present invention relates to cutting tools, and to methods of relieving such tools. More particularly it relates to hobs such as are used for generating spur, helical, and worm gears, and for cutting spline shafts, sprockets, and the like, and to methods of relieving such hobs. The present application is a continuation-in-part of my application entitled Hob, filed June 8, 1954, Serial No. 435,260; now Patent No. 2,916,803, granted December 15, 1959.

Hobs are conventionally made by gashing a thread to provide cutting teeth and relieving the cutting teeth back of their front faces to provide the hob cutting edges. The cutting teeth are so disposed that their cutting edges lie in helical threads. As a hob is sharpened and re-sharpened, its diameter is gradually decreased. A hob should, of course, produce the same profile shape on the work being cut throughout the whole useful life of the hob. Conventional hobs do not fulfill this requirement exactly. They produce tooth profiles whose pressure angles vary to a small degree.

The conventional hob gashes have straight radial profiles in sections perpendicular to the hob axis and may either be straight or helical. With hobs of small lead angles, such as single thread hobs, and with conventional gashes, the pressure angle change during the life of the hob is small. In the case of helical gashes the gashes can be kept perpendicular to the hob thread at a given hob addendum to provide equal cutting angles on both sides of the hob teeth. Straight gashes are, however, simpler and can be formed exactly with less effort; but they result in an obtuse cutting angle on the one side of the hob teeth if the cutting faces are planes containing the hob axis.

It is known that such an obtuse cutting angle can be avoided by providing front rake or hook on the hob teeth so that the cutting face of a hob tooth is a plane offset from the hob axis and parallel thereto. The provision of front rake or hook, however, increases the change in pressure angle of the tooth profiles produced during the life of the hob and makes the pressure angle change much larger on one side than occurs where there is no front rake or hook.

One object of the present invention is to provide a hob which will produce a constant pressure angle throughout its life even though its diameter changes.

Another object of the invention is to provide a hob of moderate lead angle which can have straight gashes and front rake but without incurring errors of shape during the hob life.

A further object of the invention is to provide a hob whose pressure angle decreases during its life in such way that combined with decrease in its diameter it will produce a profile shape of constant pressure angle.

A main object of the present invention is to provide a method of relieving such hobs.

Hitherto hobs were provided either with plane cutting faces or with helical cutting faces of straight profile in sections perpendicular to the hob axis. A further important object is to provide a relieving method and procedure that is not tied down to the conventional cutting faces, but can be used also with cutting faces of curved profile.

Still another object of the invention is to provide a method for semi-finishing hobs.

A still further object of the invention is to provide a method for relieving hobs of the character described on conventional machines.

Other objects of the invention will be apparent hereinafter from the specification and from the recital of the appended claims.

In the drawings:

FIGS. 1, 2 and 3 are diagrams illustrating the basic principles of the present invention and showing, respectively, axial sections of different hobs, each figure showing superimposed on one another two axial sections of the imaginary hob thread in which the cutting edges of the hob lie taken at different hob diameters, one showing the axial section when the hob is new and the other showing the axial section after the hob has been sharpened back considerably, the cross-hatching being omitted for clarity;

FIG. 13 is a diagrammatic plan view showing a grinding wheel positioned to engage one side of the teeth of a multi-threaded hob and illustrating my invention as applied to relief grinding; a part of the hob thread being shown in axial section;

FIG. 14 is a diagrammatic end view corresponding to FIG. 13, looking along the hob axis;

FIGS. 15 and 16 are views similar to FIGS. 13 and 14 respectively, but referring to the opposite side of the hob teeth;

FIG. 17 is a fragmentary normal section laid through the hob thread, showing also a grinding wheel in engagement therewith, to further illustrate the relieving method referred to in FIGS. 13 to 16;

FIG. 18 is a diagram illustrating the generation of the working surface of a grinding wheel to be used in relieving the sides of the hob teeth; and FIG. 19 is a similar diagram showing how the shape of the cutting edge of a relieving tool may be generated.

A generating hob of the character referred to represents a helical pinion capable of contacting a toothed workpiece as the hob is fed relative thereto across the face of the workpiece, usually in the direction of the work axis. As the hob rotates in timed relation with the workpiece and is fed, it describes the side surfaces of a moving rack; and the workpiece is generated conjugate to said rack.

In the involute system of gearing the rack has plane sides and, as known, the theoretical hob thread in which the cutting edges lie, is fully conjugate to said rack and adapted to contact each of the plane sides of the rack along a straight line. This form of thread is known as an involute helicoid. It contains straight profiles in planes parallel to and offset from its axis.

Figure 1:
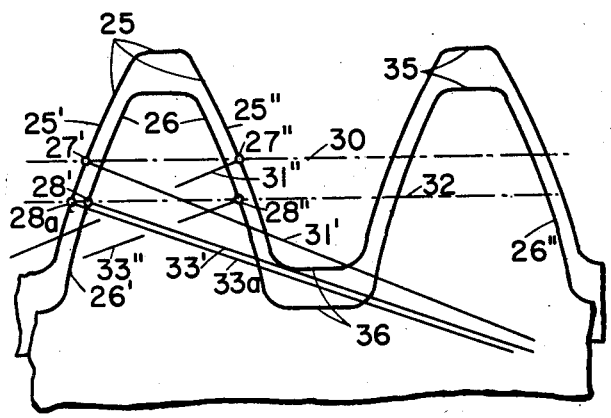

FIG. 1 shows superimposed on one another two partial axial sections of an involute helicoidal thread. The upper section 25 and the lower section 26 relate to the same hob. They are merely axial sections of the same thread at different diameters of the hob, as exist at different stages during the life of a hob. The side profiles 25′, 25″ of involute helicoid 25, and the side profiles 26′, 26″ of involute helicoid 26, are convex, the more convex, the larger the lead angle of the thread.

To clearly show up the properties, the thread illustrated corresponds to an ample lead angle, causing noticeably convex side profiles 25′, 25″, 26′, 26″. Points 27′, 27″ are mean profile points, which lie on a pitch line 30 parallel to the hob axis. They are points of opposite pitch helices of the thread. They correspond to mean profile points on the teeth of the work which may be pitch points. At the points of contact, the thread normals 31′, 31″ coincide with the tooth normals of the teeth of the work.

Since the hob thread and the work in the cutting operation turn at a constant ratio, and since their velocity component in the direction of the surface normal is equal at a point of contact, the thread and the work have the same pitch in the direction of the surface normal, that is, the same normal base pitch. Accordingly, if the points 28′, 28″ of the thread 26 of reduced diameter are to produce the same points on the work profile as the points 27′, 27″, they should have normals so directed that they also have the same normal base pitch. The points 28′, 28″ lie on a line 32 which approximately coincides with the position of pitch line 30 when the thread 26 is advanced radially to the position of mesh with the work. This requirement of a constant normal base pitch, at points 28′, 28″ as at points 27′, 27″, is automatically fulfilled on threads which are pure involute helicoids, for one of the characteristics of the involute helicoid is its constant normal base pitch at all of its points. On involute helicoids the threads 25 and 26 of the same lead and the same normal base pitch are of necessity identical threads. Profile 26′ is identical with profile 25′ and only displaced with respect to profile 25′ in the direction of the thread axis and of pitch line 30. Likewise profile 26″ is identical with profile 25″ and merely displaced along the thread axis. The normal 33′ at point 28′ has the same inclination as the normal 33$_a$ at point 28$_a$ of profile 25′, point 28$_a$ and point 28′ having equal radial distances from the thread axis. Both normals 33′ and 33$_a$ are, however, inclined to normal 31′ and define a decreased profile inclination or pressure angle. Likewise, normal 33″ at point 28″ is inclined to normal 31″ at point 27″, and defines a decreased pressure angle. These properties are known and are referred to here merely for better understanding of the present invention.

Preferably profiles 25 and 26 have the same tooth depth measured radially of the hob axis from the tops 35 to the respective bottoms 36.

Figure 2:
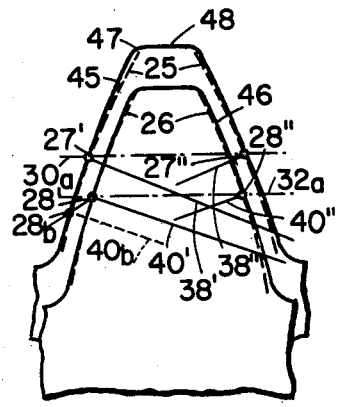

In the case of helical threads, such as shown in FIG. 2, that differ from exact involute helicoids, the requirement remains the same that the points 27′, 28′ have normals 38′, 40′, directed to result in the same normal base pitch at both points. Moreover, the points 27″, 28″ should have normals 38″, 40″ resulting in the same normal base pitch at both points. The points 27′, 28′, 27″, 28″ (FIG. 2) are the same as the points so denoted in FIG. 1; and the thread has the same lead as in FIG. 1. Normal 38′ is identical with normal 31′ of FIG. 1; and normal 38″ is identical with normal 31″. From the foregoing it follows that normals 40′, 40″ should be identical, respectively, with normals 33′, 33″ of FIG. 1, to obtain the same normal base pitch.

In FIG. 2, the side profiles of the involute helicoid are indicated in dotted lines 25, 26, while the actual side profiles 45, 46 for the two diameters of the hob are shown in full lines. These side profiles 45, 46 are tangent, respectively, to the side profiles of the involute helicoid at mean points 27′, 27″, 28′, 28″. They extend on the outside of the side profiles 25, 26 of the involute helicoid on both sides of the points of tangency; but the pressure angle of the thread 46 of smaller diameter at mean points 28′, 28″ is decreased exactly as on the involute helicoid. The pressure angle is understood to be the inclination of the surface normal to the pitch plane, that is, to a plane tangent to the cylindrical surface 32$_a$ passing through points 28′, 28″.

Thread profiles, such as indicated at 45, 46, exist on many worm gear hobs representing non-involute worms, also on hobs for generating involute gears with eased-off tooth profiles, and in other cases. Hobs are now generally designed to produce profile ease-off on the gear teeth, so that most gear generating hobs are in the class illustrated in FIG. 2.

When the profiles 25, 26 of the involute helicoids are noticeably convex, as shown, the profiles 45, 46 are less curved, that is, more nearly straight. It takes, therefore, an increased distance from the pitch line 30$_a$ to a point 28$_b$ where the profile normal 40$_b$ is parallel to profile normal 40′ at point 28′. If the cutting faces of a hob were axial planes a relieved side surface of a tooth of the hob should contain the profile corresponding to the particular side surface considered. In principle, this side surface can be obtained by moving a cutting edge 45, for instance, laterally and outwardly, so that, for instance, the point 28$_b$ moves on the line 28$_b$—28′ inclined to the hob axis. This relieving motion would have to be superimposed on a relative helical motion between the tool and the hob blank, about and along the axis of the hob. It would produce a relieved surface which gives the required inclination of the cutting edges when intersected by cutting faces extending along axial planes.

More broadly, with either plane or helical cutting faces, a side surface of the relieved hob could be produced by a lateral and outward relieving motion of a cutting edge, which is the counterpart of the cutting edge of the hob. Again this motion would be superimposed on a relative helical motion about and along the hob axis. This process would produce the required decrease of pressure angle from front to back, so that the hob pressure angle decreases as the hob diameter decreases.

This possible method of relieving has drawbacks. The depth of the hob teeth changes from front to back, and has to be substantially larger at the front to have sufficient depth left at the back when the tool has been sharpened to its limit. The relieving tool then would have to have a point width narrow enough to clear the opposite side of the deep slot at the front. This weakens the tool and also limits the length of the cutting teeth. In addition, the edge round 47 cannot be put on in the same operation, since the relieving tool does not move in the direction of the top edge. It is therefore more difficult to obtain a good blending between the side 45, or 46, and the edge round. Moreover, a separate operation is more costly. Furthermore, the tops 48 cannot be relieved together with the sides. For these reasons I prefer the method of relieving which is fully described hereinafter.

Figure 3:
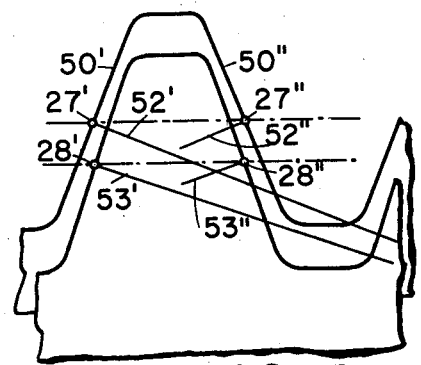

FIG. 3 shows two axial sections of hob threads of different diameters which have straight side profiles 50′, 50″. Here, the points 27′, 28′, 27″, 28″ are the same as the points denoted in FIG. 1 and the thread has the same lead as in FIG. 1. Normals 52′, 52″ are identical with normals 31′ and 31″, respectively; and the normals 53′, 53″ at the points 28′, 28″ should be identical with the normals 33′, 33″ of FIG. 1, respectively. Only in this way is it possible for points 27′, 28′, 27″, 28″ to produce the same profile inclination at the same points of the profiles of a toothed workpiece, with a hob of a given constant lead.

Figure 5:
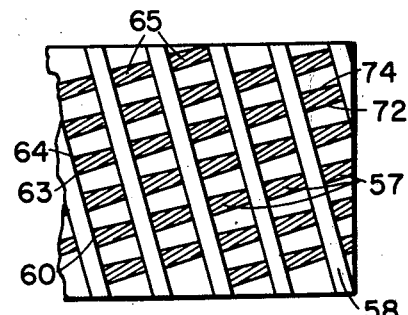
FIG. 5 is a partial development to a plane of the cylindrical pitch surface of a hob having multiple threads and helical gashes.
Figure 4:
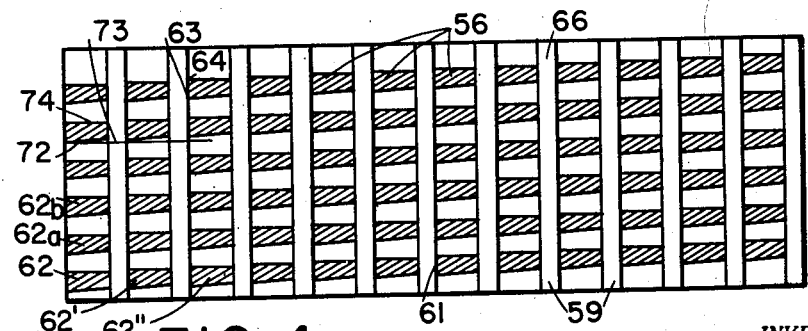
FIG. 4 is a development to a plane of the cylindrical pitch surface of a straight gashed hob near the start of the life of the hob.

Hobs constructed in accordance with the present invention may have a single thread 56 as shown in development in FIG. 4, or multiple threads 57 as indicated in FIG. 5. In the latter case, helical gashes 58 are preferably used, forming cutting faces 60. On single thread hobs (FIG. 4), and on some double thread hobs of moderate lead angle, straight gashes 59 with plane cutting faces 61 are preferably used, although helical gashes may be used if desired.

In all cases, the hob has a plurality of cutting teeth 62 (FIG. 4), 65 (FIG. 5) disposed side by side, like the teeth 62, $62_a$, $62_b$ (FIG. 4), and also in line following each other, like the teeth 62, 62′, 62″. Cutting edges 63, 64 are formed by the cutting faces 60 or 61 at the junctures of one side of the gashes and opposite sides of the thread. The cutting edges of the teeth 62, 62′, 62″, which follow each other, lie in a helicoid of constant lead, in a helical thread referred to as the hob thread. The hob thread is a thread or tooth of a helical pinion capable of contacting with the teeth of the work. The hob represents a helical pinion, that is, a cylindrical pinion with one or more thread-like helical teeth. Ordinarily, but not necessarily, the hob teeth are alike.

Figures 6, 7:
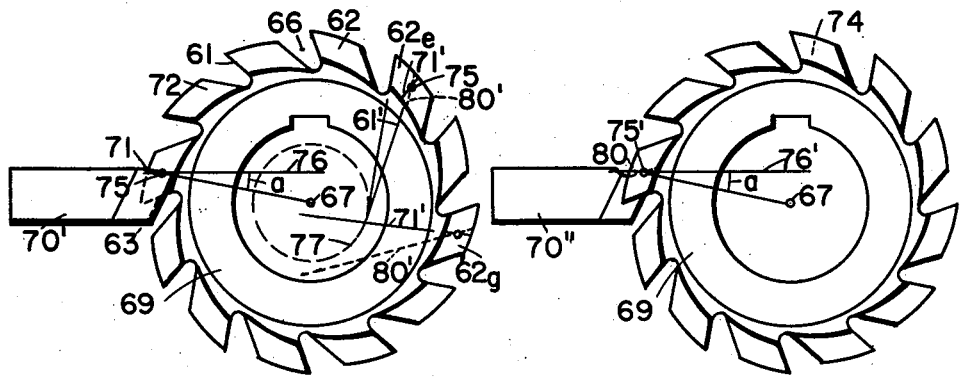
FIG. 6 is an end view of a hob which is gashed to have plane cutting faces, and showing a relieving tool in operative contact with one side of the hob teeth.
FIG. 7 is an end view of the hob shown in FIG. 6, illustrating the relieving tool in cutting contact with the opposite side of the hob teeth.

A preferred form of hob with a single thread, or at least a hob of moderate lead angle, is shown in an end view in FIG. 6. This hob has straight gashes 66 whose one side constitutes the cutting face 61. It is a plane parallel to and offset from the hob axis 67. The offset is in a direction to provide front rake, so that a keener cut is obtained.

Figure 8:
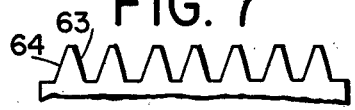
FIG. 8 is a front view of a plane cutting face of the hob of FIGS. 6 and 7, showing how the cutting edges are differently curved at opposite sides of the hob teeth.

FIG. 8 is a view of a plane cutting face, and shows the cutting edges 63, 64. They are unequal, because of the offset of the gashes from the hob axis. Their inclination is different, so that the tooth profile leans somewhat. Furthermore, they are differently curved, edge 63 being more convex than edge 64. For simplicity, I have shown in FIG. 8 the basic cutting edges, the cutting edge of an exact involute helicoid without profile modification. The actual cutting edges for profile ease-off are as different on the two sides as these basic cutting edges and they are tangent to the basic cutting edges at their mean points.

If a relieving tool were used for relieving the hob which had a shape that was a counterpart of a cutting edge of the hob teeth, the two sides of the hob teeth would require relieving tools having differently curved cutting edges. With the present invention relieving tools are used having straight cutting edges, and the relieving tools are positioned so that a hob is attained adapted to produce a suitable profile ease-off on each side of the teeth of the work. Moreover, the direction of the cutting edge of the relieving tool is so related to the direction of the relieving motion that the required decrease in pressure angle is obtained as the hob diameter is gradually decreased by sharpening.

The relieving motion is in the form of successive passes. It is preferably made along a straight line lying in a plane perpendicular to the hob axis. This motion is in addition to a relative helical motion between the relieving tool and the hob to be relieved, which is a timed motion along and about the hob axis.

FIG. 6 shows a relieving tool 70′ with straight cutting edge 71 in cutting engagement with the relieved side 72 of a hob tooth 62. This is the side of the hob tooth with the cutting edge 63 (FIG. 4) which is more inclined to the peripheral direction 73 of the hob than the hob thread, and more inclined than the opposite side 74.

In the view of FIG. 6, the cutting edge 71 of the relieving tool appears inclined at an angle $x$ (not shown) to a radius 67—75 passing through a mean point 75 of the cutting edge. The relieving motion is horizontal, so that mean point 75 describes a straight line 76 which includes an angle $a$ with radius $r$, of the hob, where radius $r$ is the distance 67—75.

The cutting edge of the hob tooth itself lies in a plane cutting face 61, which is preferably kept at a constant offset from the hob axis during the entire life of the hob 69. When it passes through mean point 75, the hob cutting edge and the cutting face appear as a straight line 61′ drawn through point 75 tangent to a cylindrical surface 77 whose radius equals the offset of the plane cutting face 61 from the hob axis 67.

Similar conditions exist on the opposite side 74 of the hob teeth illustrated in FIG. 7. The relieving tool 70″ has a straight cutting edge 80 which appears inclined at an angle $x$ (not shown) to radius 67—75′, where 75′ denotes a mean point of the cutting edge having the same distance $r$ from the hob axis 67 as mean point 75 of FIG. 6. Angle $x$ is numerically different from the angle between the radius and the projected cutting edge of the relieving tool on the opposite side (FIG. 6). The same symbol is used because the equations disclosed hereafter apply equally to both sides. The hob cutting edge passing through mean point 75′ again lies in the plane cutting face 61 of the hob, and appears as a straight line offset from the hob axis 67 and omitted in this figure. The relieving motion is horizontal, so that mean point 75′ travels on straight line 76′, inclined at an angle $a$ from the radius $r$, which is here the distance 67—75′. In the embodiment illustrated in FIGS. 6 to 9 the angle $a$ is the same on both sides of the hob teeth; but it does not necessarily have to be so.

The relieving motion is in a plane perpendicular to the hob axis 67, and in the above embodiment it is equally directed on both sides of the hob teeth, lines 76 and 76′ being equally offset from the hob axis on the same side thereof. The relieving tools 70′, 70″ for opposite sides may then be combined into single tool 70, see FIG. 9, which contains the cutting edges 71, 80. These are provided on different teeth of the relieving tool, and engage opposite sides of different hob teeth 62, $62_b$, and of different tooth spaces. The teeth 62, $62_b$ are spaced teeth, that is, they are non-adjacent.

The cutting edges 71, 80 are askew to each other, that is, they are angularly disposed and offset from each other, as would be apparent if the tool 70″ of FIG. 7 were superimposed on the tool 70′ of FIG. 6. Different cutting faces 85, 84 are provided for them, which are planes inclined to each other. These planes are also inclined to a line 500 that connects the outer ends of said cutting teeth. With the disposition shown the cutting faces are prevented from interfering with each other, and are easily sharpened.

Figure 9:
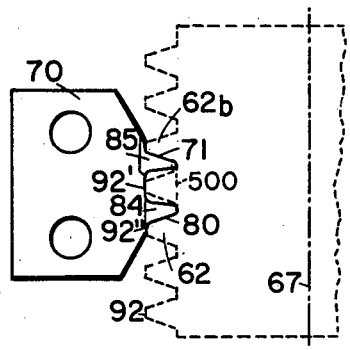
FIG. 9 is a more or less diagrammatic plan view showing a relieving tool combining the two tools of FIGS. 6 and 7 and showing the hob outline in dotted lines.
Figures 9A, 10:
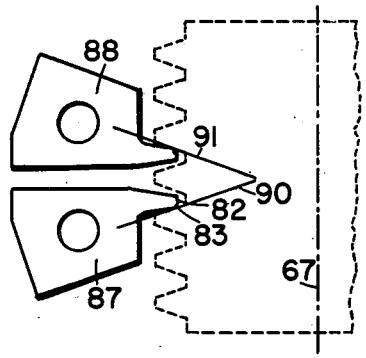
FIG. 9a is a front elevation of the relieving tool.
FIG. 10 is a plan view showing a pair of relieving tools in engagement with a hob, the hob being shown in outline, and illustrating a relieving method suited especially for semi-finishing.

FIG. 10 illustrates a procedure preferably followed for semi-finishing hobs. After the unrelieved hob thread has been gashed, a pair of relieving tools 87, 88 are used which cut with their front ends only. Each has an end cutting edge 82 and an edge round 83 joining edge 82. The tools and the work perform a relative helical motion, which may be obtained by turning the work uniformly on its axis 67 and moving a tool carriage in the direction of said axis in a constant proportion to said turning motion; and in repeating this process after covering the whole length of the hob to be cut. In addition to this helical motion, the tool is preferably given a periodic uniform relieving motion in a plane perpendicular to the hob axis 67 at a rate of once for each hob tooth. Tool 87 is furthermore fed slowly in the direction of inclined line 90, either intermittently or uniformly, so that each time the length of the hob is covered, the tool has been slightly advanced along line 90. This line is therefore successively described by the tool; and the same shape can be produced as with a straight-edged side relieving tool, whose side-cutting edge is a portion of line 90. Line 90 may be directed like line 80 of FIGS. 7 and 9, and is then offset from the hob axis 67.

Relieving tool 88 is similarly fed along line 91, and describes part of line 91.

Both tools can be used simultaneously when provision is made therefor on the relieving machine.

This process results in shorter and thicker chips than relieving processes where a side-cutting tool is used which cuts along its whole depth. The chip load is lighter for equal chip areas. Moreover, with the same chip load, or cutting force, larger chip areas can be tackled. It is, therefore, faster. It is applicable to all relieving processes of hobs with nearly straight cutting edges.

The feed along lines 90, 91 may be either towards or away from the projected hob axis 67. In the latter case the cut starts at the tooth bottom of the hob. It is especially suitable when the hob has projecting portions adjacent the top of its teeth, to provide extra relief at the root portion of the teeth cut, for subsequent shaving. The tool describes line 90 or 91 with its convex edge round 83 to near the outer end of the hob teeth. The tool feed is then stopped, so that the final shape adjacent the outside end of the hob teeth, the projecting portion, is applied by the side-cutting edge of the tool.

The final finishing cut is preferably applied with a tool having cutting contact along the whole depth of the tooth, as by a tool 70, FIG. 9, or by a grindling wheel. The tooth tops 92 can be relieved in the same operation as the sides by a cutting edge 92′ provided intermediate the cutting edges 71, 80. The edge rounds can also be applied to the hob teeth in the same operation by a concavely curved portion 92″ joining a side cutting edge 71 or 80.

Even when the tooth tops of the hob are relieved in a separate operation from the sides of the hob teeth, at least the portion of the edge round immediately adjacent each side cutting edge of the hob is added during relieving of the adjacent side of the hob teeth, to obtain a smooth blend at the region where it is most important.

The present invention also applies to hobs which have projecting portions adjacent the tooth tops for extra relief at the tooth bottoms of the gears cut thereby. Such extra relief is used on gears intended to be shaved after hobbing.

Also, while I have shown relieving tools with individual cutting edges, it should be understood that I may also use grinding wheels for applying the final relieved shape. In this case some known modifications have to be made in the wheels profiles to produce a shape such as defined by tools with individual cutting edges.

Referring further to FIGS. 6 and 7, and to the hob 69, the relieved side surfaces 72 and 74 are obtained as the relative path of straight cutting edges 71, 80. These surfaces are, therefore, composed of straight line elements 71′, 80′, best shown on hob teeth $62_e$ and $62_g$. These straight line elements, which are shown extended inwardly beyond the hob teeth, are offset from the hob axis 67, the straight line element 80′ being more offset than 71′, but both elements passing the hob axis on the same side. Hob tooth $62_e$ shows their comparison with the cutting face 61′ passing through mean point 75. The two elements appear oppositely inclined to cutting face 61′ and to the hob cutting edge.

Also, because of their inclination to the direction of the relieving motion 76, 76′, the offset of the straight line elements from the hob axis changes on the hob teeth from front to back. The elements 71, 71′ of side 72 are increasingly offset from front to back. The elements 80, 80′ of side 74 have an offset decreasing from front to back. That is best seen in FIG. 7, where edge 80 can be visualized to be less offset in its inmost position than in the positon shown.

Both sides of the hob teeth, furthermore, are so relieved that the hob pressure angle decreases from front to back, like the pressure angle of an exact involute helicoid.

Preferably the hob is sharpened in the same way throughout its life. Hob 69 then keeps its plane cutting face 61, which has a constant offset from the hob axis 67, during the entire life of the hob. The property of a decreasing pressure angle at a given hob addendum is then built into the relieved side surface of the hob teeth, as will further be described hereafter.

Figure 11:
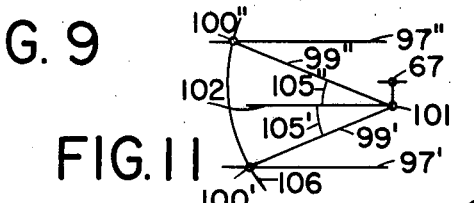
FIG. 11 is an auxiliary diagram.
Figure 12:
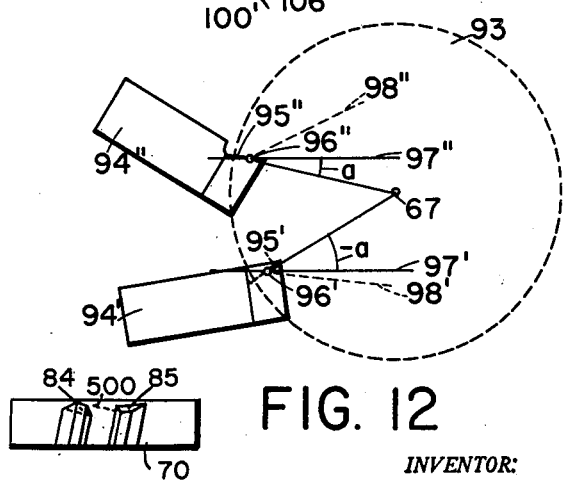
FIG. 12 is a diagrammatic end view along the hob axis and illustrating a pair of relieving tools for relieving opposite sides of the hob teeth in accordance with a modified method preferred on hobs with ample lead angles and constructed in accordance with the present invention.

FIGS. 11 and 12 refer to an embodiment where the hob has a substantial lead angle. In such a case, helical gashes, such as shown at 58 in FIG. 5, are used, while with a moderate lead angle, either straight or helical gases are feasible.

In FIG. 12 the hob 93 is indicated by its dotted outline only. Except for the helical gashes and the steeper threads it is similar to hob 69. The opposite sides of the hob teeth are then preferably relieved with differently directed relieving motions. This does not exclude simultaneous relieving of both sides of the hob teeth with a pair of relieving tools mounted on the same relieving slide. Tools 94′ and 94″ correspond to the tools 70′ and 70″, and operate on the front side and on the rear side respectively of a thread. The considered thread is a right-hand thread as are all the threads specifically illustrated, and is viewed from the side calling for counterclockwise hob rotation. Right and left hand threads can be considered mere images of one another with respect to an axial plane; and the solution for one hand also provides the solution for the opposite hand.

Tool 94′ with cutting edge 95′ has a uniform relieving motion in a plane perpendicular to the hob axis 67, so that mean point 96′ describes part of a straight line 97′ in each relieving pass. Line 97′ lies in said plane, and is offset from the hob axis 67. It includes an angle $a$ with radius 67—96′, to be used with a negative sign in the equations, which are referred to hereinafter, and which are included in my prior application Serial No. 435,260 above mentioned. The surface normal 98′ of the continuous hob thread is also offset from the hob axis 67. It should be noted that the normal 98′, as well as line 97′, are offset in the same general direction from the hob axis; that is, they pass the hob axis on the same side. Tool 94″ with cutting edge 95″ has a uniform relieving motion such that its mean cutting point 96″ describes part of a straight line 97″. This line also lies in a plane perpendicular to the hob axis and is offset from the hob axis on the opposite side as compared with line 97′. It is offset on the same side as the surface normal 98″ of the hob thread at mean point 96″, and includes an angle $a$ with radius 67—96″, to be used with a postive sign in the above-mentioned equations.

In the illustrated case, the offsets of the relief paths 97′, 97″ are smaller than the offsets of the thread normals 98′, 98″, and their amounts of offset differ.

If both tools, 94′, 94″ are used together and are mounted on the same relieving slide, they should be positioned so that the relieving motion has the same direction with both tools, that their directions 97′, 97″ of relieving are parallel to each other, as shown. The tools are then positoned to operate simultaneously on spaced hob teeth facing different gashes and having different cutting faces. Also if both tools are used together, the same amount of relieving motion is used with both tools.

To this effect, the positions of the two relieving paths 97′, 97″ should be related to each other as indicated in FIG. 11. The relief curves produced should be equally inclined to the peripheral direction on the two sides in an end view along the hob axis. That is, the normals 99′, 99″ of these curves at the mean points 100′, 100″ of the top surfaces should be equally offset from the hob axis 67. These normals are known to pass through an instantaneous axis 101 parallel to the hob axis and offset therefrom. Distance 67—101 depends upon the amount of relief. It can be considered the radius of a circle whose circumference is equal to the relieving distance traveled, if the relieving motion were to continue uniformly through a full turn of the work. The normals 99', 99'' are equally offset from the hob axis 67, when they are equally inclined to a line 102 passing through instantaneous axis 101 and parallel to lines 97', 97'' so that the angles 105' and 105'' are equal.

Accordingly, when one of the two normals 99', 99'' is assumed, the other normal is determined from the said requirement. The top points 100', 100'' are determined as the intersection of the normals 99', 99'' with a circle 106. This circle represents the cylindrical surface in which the outside cutting edges lie at an intermediate stage of the hob life. The different offsets from the hob axis 67 of the lines 97', 97'' drawn through points 100', 100'' are thus determined.

This relationship does not have to be observed when the two sides of the hob teeth are relieved in separate operations, and different relieving cams may be used on the two sides.

General Principles

As already stated, a cylindrical hob cuts teeth of constant profile inclination or pressure angle during its whole life, even though the hob diameter changes, if at its mean point the hob cutting edge remains tangent to an involute helicoid. This involute helicoid has the same lead as the hob thread and contacts the hob cutting edge of a given mean life stage at the mean point of said cutting edge.

A detailed and rather long mathematical treatment dealing with the relieving operation, with equations, is given in application Serial No. 435,260 above mentioned. Reference is made to it, without reproducing it here in full. However the relieving principles will be described further.

In the method of the present invention the uniform and rectilinear relieving motion is retained; but the direction of the relieving stroke is altered to achieve the desired effect. One problem is to determine this direction and the amount of the stroke. A second problem is to determine the profile shape of the relieving tool.

In one embodiment a relieving tool is used whose cutting edge directly matches the cutting edge of the hob at the given means stage of the hob life. This solves the second problem in this case. When a grinding wheel is used, it can be so positioned that it contacts the hob tooth along a line tangent to the hob cutting edge at its mean point, in the given mean life stage of the hob. This then determines the profile of the grinding surface in that direction.

It will be shown hereafter how the said second problem can be solved mechanically in a more general way, without requiring a specific position of the grinding wheel or of the cutting edge of the relieving tool.

Returning to the said first problem, we know the cutting edge of the given hob thread, the thread at the given mean life stage of the hob. It is the intersection of the hob thread with the given straight or helical cutting face.

While it is customary to employ cutting faces that have a straight profile in planes perpendicular to the hob axis, we need not confine ourselves to this shape. We may use curved profiles also. Customarily the cutting face remains an identical surface at all stages of the hob life, except for a shift of the outside and inside boundaries. The present relieving method applies however also with cutting faces that are changed in a pre-determined manner with the hob diameter.

Next we direct our attention to the mean points of the hob cutting edges at different stages of the hob life, that is to the points 28', 28'' (FIGS. 1 to 3) and to the cutting-edge tangents at these points. These tangents are also tangent to said involute helicoid that contacts the given hob thread at mid-height. They can be determined in known manner from the intersection of the known involute helicoid with the given cutting face, or with the given cutting faces if these are changed with the outside diameter of the hob.

After tentatively assuming a direction of the relieving motion, and a rate thereof to conform to the desired relief at the mean computation point (27', 27''), we may determine the relieving direction at another mean point (28', 28'') that corresponds to another stage of the hob life and that has a different distance from the hob axis, and the direction of the relative path of the tool with respect to the hob. This last-named direction, together with the determined profile tangent, defines the tangent plane at the hob tooth as required at said other point (28', 28'') with the assumed relieving motion. The cutting edge of a relieving tool should pass through said other point and be tangent to said plane, or lie in said plane if the tool cutting edge is straight. Also, when a grinding wheel is used, its grinding surface should pass through said other point and should be tangent to said plane. Unless this condition of tangency is fulfilled with the assumed direction of the relieving motion, another direction of the relieving motion is assumed and tried, on paper. The final direction to be used may be found by interpolation.

The above described steps may be carried out geometrically, at a large scale, or by actual physical test, or by computation. When computing, the said other point (28', 28'') is preferably assumed at an infinitesimal distance from the starting point (27' and 27''), and the procedures of calculus are used to determine the relieving direction, that is the direction of the relieving stroke.

It is found that the required relieving path (97', 97''), FIG. 12, or projected relieving path, is offset from the hob axis 67 and inclined from the projected normal (98', 98'') of the relief surface contacted by the tool.

Relief Grinding

An application to relief grinding will now be described with FIGS. 13 to 18. This important embodiment is also applicable to relief cutting. It is most significant on hobs with ample and large lead angles, as may occur on multi-threaded hobs. On such hobs especially, the offset relieving direction used is more effective than a radial relieving direction. A tool (94', 94''), FIG. 12, that moves in the drawing plane in the direction of the projected surface normal (98' or 98'') requires the least movement to achieve a given relief. And the relieving direction used differs less therefrom than the radial direction.

In the embodiment now being described, a relieving tool is so moved that a mean point of its cutting edge cuts the mean points (such as 27', 28') of the hob profile, and that a portion of its cutting edge follows the top of the hob teeth. If a bulge or projecting portion is provided adjacent the top of the hob teeth, the radial extent of the bulge is then preserved during the entire hob life. Likewise a grinding wheel is so moved that the means circle of its grinding surface grinds the mean points of the hob profile.

When the relieving tool including a grinding wheel is stroked in the required direction in a plane at right angles to the hob axis so as to follow the mean points and the desired top of the hob teeth, it produces more relief that corresponds to the tooth's top of the hob. In accordance with the invention the relief is decreased to the required amount by adding an axial component to the relieving motion. The resultant relieving motion is then in a direction inclined to planes perpendicular to the hob axis.

This is illustrated in the drawings, FIGS. 13 and 14 relating to one side of the hob teeth, and FIGS. 15 and 16 to the other side. Grinding wheel 200 (FIGS. 13, 14) contacts the side 202 of the right hand hob 204. 205 is a mean point of contact. Periodic depthwise relieving motions or relieving strokes in direction 205—206 are provided between the relieving tool and the work 204. This direction is inclined to planes perpendicular to the work axis 207 (FIG. 13). The relieving stroke itself can be plotted enlarged as a distance 205—206. It contains a component 205—206′ lying in a plane perpendicular to the work axis, and a component 206′—206 parallel to the work axis. The last-named component is in a direction to decrease the relief produced.

Component 205—206′ bypasses the work axis 207, and as in FIG. 12 is inclined to the projected normal (not shown in FIG. 14) of the hob relief surface contacted. In addition to the relieving motion a helical motion is effected between the work and the tool about and along the work axis, as in common practice. The turning motion thereof, in the direction of arrow 210 when the relieving stroke is along arrow 211 is preferably imparted to the work, while the motion along the work axis may be imparted either to the tool or to the work.

The grinding wheel 201 (FIGS. 15, 16) engages the side 203 of the hob 204, the workpiece or work. The relieving stroke is represented in enlargement by distance 215—216. It contains a component 215—216′ lying in a plane perpendicular to the work axis 207, and a component 216′—216 parallel to the work axis in a direction to decrease the relief produced. Components 215—216′ bypasses the work axis 207 and is inclined to the projected normal of the contacted hob relief surface. The axial components 216′—216 and 206′—206 differ from one another.

Conventionally the relieving motion is in a direction towards the work. It could be reversed if desired. With the grinding wheel 201 placed on the side shown in FIGS. 15 and 16, the relieving motion is in a generally opposite direction as compared with that of FIGS. 13 and 14. A second relieving slide is then required, at least when both sides are to be relieved simultaneously.

It should be noted that the pair of relieving tools 200, 201 contact opposite tooth sides of the work in regions vertically displaced from the work axis to the same side, here below said axis. As in FIGS. 6 and 7 each tool is moved in a horizontal direction offset from the work axis and inclined to the cutting faces.

A single relieving slide will do when the two sides 202, 203 of the hob teeth are relieved one at a time. We can imagine the assembly of FIG. 16 turned about the hob axis 207 through half a turn. This places the grinding wheel 201 above center and on the same side of the work as wheel 200. If a position below center is preferred, the assembly of FIG. 16 may be turned through half a turn about a vertical axis passing through the hob center at right angles to the hob axis. The work rotation is then preferably reversed. Also if a wheel position above center is preferred to the position shown in FIG. 14, the whole assembly of FIG. 14 could be turned about a horizontal axis passing through the hob axis at right angles thereto.

I have shown wheel positions below center to keep the wheels closest to the relieving slide, with least overhang and least weight.

Normal section, FIG. 17, further shows how a wheel moved in the required offset direction in a plane perpendicular to the hob axis produces more relief than desired. The relieving stroke of wheel 200 in said plane is shown exaggerated and represented by distance 205—206′. The relieving component 206′—206 axially of the hob, also shown exaggerated, reduces the effective relieving stroke to the desired amount 205—206 which is shown exaggerated too.

FIGS. 13 to 17 show grinding wheels that have slightly concave active grinding profiles to produce a slightly convex profile on the hob teeth. Curved profiles are required even on involute hobs when the lead angle is ample or large. The hob 204 as illustrated has unconventional cutting faces, one being shown at 214 in a section perpendicular to the hob axis. Its profile is concavely curved, while the conventional helical cutting face has a straight radial profile. The illustration is to show that the method is applicable to all kinds of helical and straight cutting faces.

A mechanical determination of the profile required on the relieving tool will now be described. This tool may be a grinding wheel or a cutting tool.

*Generation of Tool Profile*

To generate the shape of the working surface required for instance on wheel 200 of FIG. 14, a dummy wheel 200′ (FIG. 18) is made of a suitable material which can be readily cut, for instance Lucite. Also the known shape of the continuous hob thread at the given mean life stage is applied to what may be called a master 204′. The master has no relief.

A gash as used on the hob would produce the required hob cutting edge 220 on the master 204′, as the intersection of the cutting face with the hob thread 221. Here however we use a different gash, whose one side surface is the exact counterpart of the cutting face of the hob. While on the hob, FIG. 14, the cutting tooth 222 is above the cutting face 223, the metal is below the cutting face 223′ on the master. However as the cutting surface itself is the same, the same cutting edge 220 is produced on the master by the counterpart cutting face.

The dummy wheel 200′ is set to a final position exactly like the grinding wheel. It is rotated against the cutting face of the master, in the direction of arrow 225. The master is set in the place of the hob or workpiece. As the dummy wheel rotates rapidly the dummy wheel as well as the master perform the same motions as the grinding wheel and work, at a very slow rate. The required shape is thereby generated on the rotating wheel 200′ by the edge 220 in a single very slow relieving stroke.

In the hob relieving operation the grinding wheel generates the hob cutting edge and the entire relieved tooth side of the hob, whereby the different portions of the hob cutting edge are swept by different portions of the wheel profile. Here now the roles are interchanged, and the cutting edge of the master sweeps the wheel surface and thereby generates it.

The generated wheel profile is then transferred to the grinding wheel in any suitable known way.

FIG. 19 relates to the generation of the cutting edge of a relief-cutting tool, where the cutting edge is inclined to the cutting edge of the hob, and then differs from the hob cutting edge. While FIG. 19 shows a cutting face with straight profile, it should be understood that the described generation is also valid when the cutting face has a curved profile.

The unrelieved thread 160 is applied to a workpiece 161 with an axis 67. The diameter of this thread, in which the hob cutting edges are to lie, is made to correspond to an intermediate stage in the life of the hob. The counterpart 162 of a hob cutting face is then applied, so that its straight profile 163 has the same distance from the axis 67 as the profile of the hob cutting face. However, what is a positive hook or front rake on the hob appears as a negative hook on the piece 161. Its cutting edge is identical with the required hob cutting edge, since it is produced as the intersection of the same surface with the unrelieved hob thread.

Piece 161 is then imparted a turning motion on its axis 67 in the direction of arrow 164, while the relieving tool is represented by part 165, which is mounted on the relieving slide (not shown). There is also a lead motion effected between part 165 and piece 161 in accordance with the lead of the hob thread. Part 165 moves outwardly in the direction of the arrow 166 during the turning motion of piece 161 in the direction of arrow 164, and is constrained to do so by the same relieving cam as used on the hob. In other words, piece 161 and part 165 go through the relieving motion in reverse. This motion may be hand-operated and repeated.

Part 165 contains a pair of thin plates or templates 170 secured to it at its lower face, made of suitable material which can be cut freely. The pair of plates contact each other along a central plane 171 which represents the cutting face of the relieving tool whose exact profile shape is to be determined, and whose direction or tangent has already been determined in the way described. In the said reverse relieving motion, the hob cutting edge of piece 161 will describe a surface on the pair of plates 170. Its intersection with the central plane 171 of the plates 170 is the sought cutting edge of the relieving tool. From there a duplicate is applied to the relieving tool.

A reversal of the relieving motion is used rather than the direct relieving motion so that interference with the unrelieved sides of the hob thread is avoided. The shape produced is the same. It is a direct generation of the relieving edge with the cutting edge of the unrelieved hob thread.

While the invention has been described in connection with several different embodiments thereof, it is capable of further modifications, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. The method of relieving a hob, which has helically arranged cutting teeth, which comprises positioning a relieving tool and a rotary hob blank in engagement along a line, the mean tangent of which is offset from the hob axis, and while effecting relative motion between said tool and the hob blank about and along the hob axis, simultaneously effecting periodic depthwise relieving movements between tool and blank once for each tooth of the blank along a straight path offset from the hob axis in such direction that said mean tangent changes in offset from the blank axis from the start to the end of a relieving movement.

2. The method of relieving both sides of the cutting teeth of hobs which have helically arranged cutting teeth, which comprises positioning tool means and a rotary hob blank in engagement along a line on each side of a hole tooth, the mean tangent of which is offset from the hob axis, and effecting relative motion between said tool means and said blank about and along the blank axis, while effecting periodic depthwise relieving movements between the tool means and blank once for each tooth of the blank, so that a mean point of each said line moves in a straight path offset from the blank axis, so that the tangent to each said line at said mean point changes its offset from the hob axis from the start to the end of a relieving movement, the paths of said points for the opposite sides of a cutting tooth being offset from the blank axis in different directions.

3. The method of relieving a rotary hob having a plurality of helically arranged cutting teeth, which comprises positioning a pair of relieving tools in engagement with the work so that said tools contact opposite tooth sides of the work in two regions on opposite sides of a plane containing the work axis, and effecting relative motion between said tools and the work about and along the work axis, while moving both said tools periodically once for each tooth of the hob depthwise of the hob teeth in a straight path parallel to said plane to effect relief of the teeth, whereby the line of contact between a tool and a tooth side is inclined to a plane parallel to the work axis and containing said path.

4. The method of relieving a hob, which has helically arranged cutting teeth, which comprises positioning a relieving tool in engagement with the work, said tool having a convex edge round adjacent its tip end followed by a straight side-cutting edge, effecting a relative helical motion between said tool and work about and along the work axis, repeating said helical motion, effecting periodic depthwise relieving motions once for each tooth of the work between said tool and the work during each said helical motion in time with said motion, feeding said tool from the tooth bottom outwardly relative to the work in a straight line inclined to a plane perpendicular to the work axis, so that said tool describes said line with said edge round in the aggregate of said helical motions, and terminating said feeding motion before said edge round has reached the tip end of the hob teeth, so that said straight side-cutting edge applies the final shape adjacent the tip end of the hob teeth.

5. The method of relieving a hob having cutting teeth arranged in at least one thread and having cutting faces traversing said thread, which comprises positioning a pair of relieving tools in engagement with the work so that said tools contact opposite tooth sides of the work in regions vertically displaced from the work axis to the same side, and effecting relative motion between said tools and the work about and along the work axis, while moving each tool periodically once for each tooth of the work depthwise of the hob teeth in a horizontal direction inclined to said cutting faces and offset from the work axis, to produce relieved side surfaces on said cutting teeth.

6. The method of relieving a hob, which has helically arranged cutting teeth, which comprises positioning a relieving tool in engagement with the work, and rotating the work on its axis while effecting relative motion between said tool and the work along the work axis, and while simultaneously effecting periodic depthwise relieving motion once for each tooth of the work between said tool and the work in a direction offset from the work axis and inclined to a plane perpendicular to the work axis, so that said relieving motion has a component lying in said plane and a component parallel to the work axis, the last-named component being in a direction to decrease the relief produced on the sides of the teeth of the work.

7. The method of relieving a hob according to claim 6, wherein the relieving motion is along a straight path and is at a uniform rate directly proportional to the turning motion of the work on its axis.

8. The method of relieving opposite side surfaces of the teeth of a hob, which has helically arranged cutting teeth, which comprises relieving each of the two sides of the hob teeth by positioning a relieving tool in engagement with the work, and effecting relative motion between said tool and the work about and along the work axis, while effecting periodic depthwise relieving motion between said tool and the work once for each tooth of the work, said relieving motion having a component lying in a plane perpendicular to the work axis and a component parallel to the work axis, the last-named component being in a direction to decrease the relief produced and being different in magnitude on the opposite side surfaces.

9. The method of relieving a hob having helically arranged cutting teeth formed by gashing a continuous thread, which comprises positioning a relieving tool for engagement with one side of said cutting teeth, effecting helical motion between said tool and hob about and along the hob axis to relatively move the hob thread past the relieving tool, and effecting a periodic depthwise relieving motion between the tool and hob as each hob tooth is engaged by the tool, said relieving motion being in a direction offset from the hob axis and, in an axial view of the hob, inclined to the projected surface normals of both the continuous hob thread and of the relieved side surface of the hob tooth engaged by the tool, to achieve a hob thread whose profile inclination decreases with decreasing hob diameter.

10. The method of relieving a rotary hob, which has helically arranged cutting teeth, which comprises positioning a relieving tool in engagement with the work, and effecting a relative helical motion between said tool and the work about and along the work axis to cause the tool to follow the helical thread of the hob, while effecting periodic depthwise relieving motions once for each tooth of the hob between said tool and the work during each said helical motion in time with said motion, and repeating said helical motion while effecting said periodic depthwise relieving motions once per tooth of the hob, and feeding said tool relative to the work in a straight line offset from the work axis and inclined to a plane perpendicular to the work axis on successive helical motions so that the position of the tool depthwise of the work changes and the tool describes said line in the aggregate of said helical motions.

References Cited in the file of this patent
UNITED STATES PATENTS

| | | |
|---|---|---|
| 899,421 | Mills | Sept. 22, 1908 |
| 1,348,306 | Muller | Aug. 3, 1920 |
| 1,357,815 | Olson | Nov. 2, 1920 |
| 2,358,489 | Carlsen | Sept. 19, 1944 |
| 2,418,320 | Simmons | Apr. 1, 1947 |
| 2,667,090 | Martin | Jan. 26, 1954 |
| 2,924,872 | Wildhaber | Feb. 16, 1960 |